United States Patent
Mayda

(10) Patent No.: US 8,137,066 B2
(45) Date of Patent: Mar. 20, 2012

(54) PRESSURE BASED LOAD MEASUREMENT

(75) Inventor: Edward A. Mayda, Roseville, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 386 days.

(21) Appl. No.: 12/424,617

(22) Filed: Apr. 16, 2009

(65) Prior Publication Data

US 2010/0266405 A1     Oct. 21, 2010

(51) Int. Cl.
*F01D 5/14* (2006.01)

(52) U.S. Cl. .......................... 416/42; 244/203

(58) Field of Classification Search .............. 416/37, 416/42; 244/201, 203
See application file for complete search history.

(56) References Cited

U.S. PATENT DOCUMENTS

| | | | |
|---|---|---|---|
| 5,457,630 A | 10/1995 | Palmer | |
| 5,585,557 A | 12/1996 | Loschke et al. | |
| 5,737,222 A | 4/1998 | Palmer | |
| 5,796,612 A | 8/1998 | Palmer | |
| 5,803,279 A | 9/1998 | Stallbaumer et al. | |
| 6,002,972 A | 12/1999 | Palmer | |
| 6,237,426 B1 | 5/2001 | Gryc | |
| 6,250,149 B1 | 6/2001 | Black | |
| 6,253,126 B1 | 6/2001 | Palmer | |
| 6,940,425 B2 | 9/2005 | Frantz | |
| 6,942,450 B2 * | 9/2005 | Yang et al. | 416/61 |
| 7,293,959 B2 | 11/2007 | Pedersen | |

FOREIGN PATENT DOCUMENTS

| | | |
|---|---|---|
| GB | 0872228 A | 7/1961 |
| JP | 53020983 A | 2/1978 |
| WO | 9957435 A | 11/1999 |

OTHER PUBLICATIONS

Gaunaa et al., Load Reduction Using Pressure Difference on Airfoil for Control of Trailing Edge Flaps, ewec, Europe's premier wind energy event, dated 2009.
International Search Report and Written Opinion for Application No. PCT/US2010/030800, mailed Jul. 7, 2010, 9 pages.

* cited by examiner

*Primary Examiner* — Chandra Chaudhari
(74) *Attorney, Agent, or Firm* — Banner & Witcoff, Ltd.

(57) ABSTRACT

A system and method for a pressure based load measurement system are provided. The system includes two pressure orifices arranged on a top surface and a bottom surface of an airfoil. The pressure differential between these two points is determined and an estimate of the aerodynamic load generated by the airfoil is determined from a linear correlation between pressure differential and load. The location of the orifices may be optimized using analytical or experimental techniques and a least squares empirical curve fit may be used to fit the data collected.

21 Claims, 5 Drawing Sheets

PRESSURE BASED LOAD MEASUREMENT

TECHNICAL FIELD

The invention relates generally to a method for measuring and/or determining a local aerodynamic load generated by a wing or blade using a single differential pressure measurement.

BACKGROUND

Airplanes and helicopters rely on aerodynamic lift generated by a wing or rotor to maintain the flight of the vehicle. In addition, wind turbines rely on aerodynamic lift to turn the rotor and generate electricity. In order to control the aerodynamic lift and optimize performance of various airfoils, it would be beneficial to quickly and easily determine the lift generated by the airfoil. Conventional systems and methods of measuring aerodynamic lift require various data points and information, such as dynamic pressure, local air speed, air density, temperature, and the like.

In some arrangements, blade adjustments may be made based on or to optimize the amount of aerodynamic lift generated by a blade. In order to effectively and efficiently control these adjustable blades, it would be beneficial to provide a method of estimating the aerodynamic load generated by a blade at any given time without requiring excessive amounts of data and/or environmental condition information.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, aspects of the disclosure are directed to a system and method for pressure based aerodynamic load measurement.

A first aspect of the invention provides a first and second pressure sensing location on an airfoil. The airfoil may be present on an airplane wing, helicopter rotor, wind turbine blade, ship rudder, or the like. The first pressure sensing location may be located on a top surface of the airfoil and the second pressure sensing location may be located on a bottom surface of the airfoil. The difference in pressure at the first and second location is determined and the aerodynamic lift may be determined based on a linear/polynomial correlation between the pressure differential and lift. In one or more arrangements, the aerodynamic lift may be determined based solely on the pressure differential between the first and second locations. Stated differently, additional sensors or sensor readings at additional locations might not be needed.

The location of the first and second pressure sensing locations may be optimized. For instance, various analytical and/or experimental testing may be performed to determine the optimal location for the first and second pressure sensing locations. A least squares empirical curve fit may be used and the locations having minimal error may be considered the optimal locations. The locations may be based on the particular geometry of a given airfoil and may be different for different sizes, types, and arrangements of airfoils.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

The reader is advised that the figures are not necessarily drawn to scale.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the present invention are directed to a method of determining an aerodynamic load generated by an airfoil (such as those on a wing, blade, etc.) using a single differential pressure measurement. The measurement is based on pressure readings taken at two locations: one along a top surface of the airfoil and one along the bottom surface. Because a linear or near-linear relationship between this pressure differential and the aerodynamic load exists, the aerodynamic load may be estimated based on this pressure differential and without requiring any additional information, such as dynamic pressure, local air speed, air density, barometric pressure or temperature, and the like.

Figure 1:
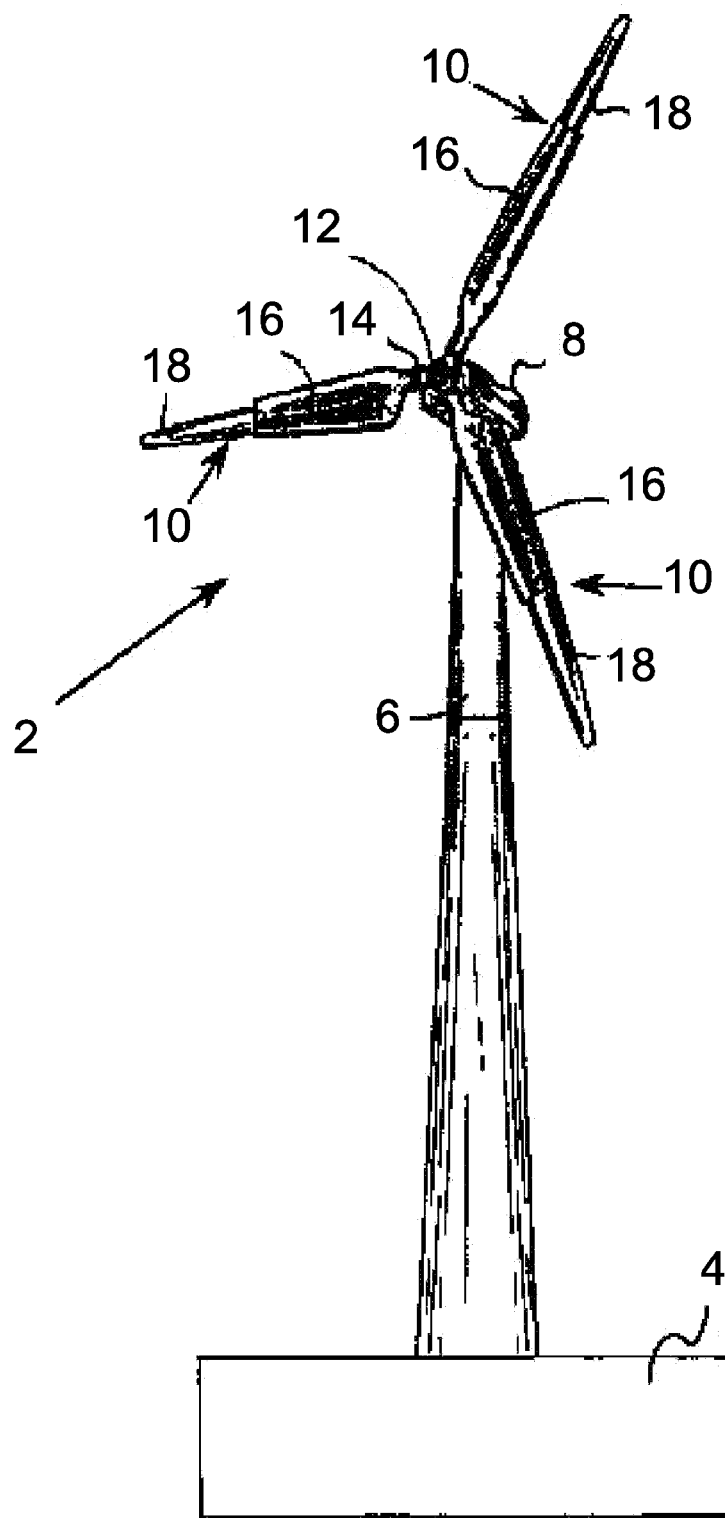
FIG. 1 is a perspective view of a wind turbine according to a first embodiment of the invention.

FIG. 1 shows an example wind turbine 2 with which the present invention may be implemented. The wind turbine 2 is shown on a foundation 4 with a tower 6 supporting a nacelle 8. One or more blades 10 are attached to a hub 12 via a bolt flange 14. In the depicted embodiment, the wind turbine includes three blades 10. The hub 12 is connected to a gear box, a generator, and other components within the nacelle 8. The blades 10 may have a fixed length or may be of the variable length-type, i.e., telescopic, such as shown in FIG. 1. As shown in FIG. 1, each variable length blade 10 includes a root or base portion 16 and a tip portion 18. The tip portion 18 is movable with respect to the root portion 16 so as to controllably increase and decrease the length of the rotor blade 10, and in turn, respectively increase and decrease the swept area of the rotor blades 10. Any desirable drive system, such as a screw drive, a piston/cylinder, or a pulley/winch arrangement may be used to move the tip portion 18 with respect to the root portion 16. Such drive systems are described in U.S. Pat. No. 6,902,370, which is hereby incorporated by reference. The wind turbine 2 further includes a yaw drive and a yaw motor, and may include a pitch control system, not shown.

Figure 2:
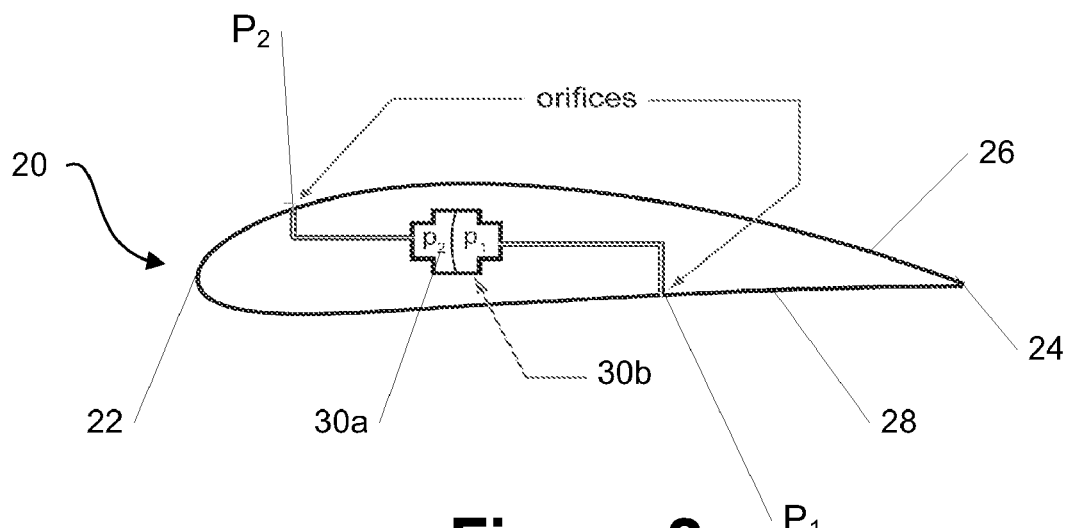
FIG. 2 is a cross-section of an airfoil, such as on an airplane wing, wind turbine blade, and the like, depicting the pressure based load measurement system described herein.

FIG. 2 illustrates one example cross section of an airfoil, such as from an airplane wing, wind turbine blade, etc. as used in conjunction with the present invention. The airfoil includes a leading edge 22, a trailing edge 24, a top surface 26 and a bottom surface 28. A chord line, c, can be defined as a line between the leading edge 22 and the trailing edge 24 of the airfoil 20. The airfoil 20 shown in FIG. 2 is merely one illustrative cross-sectional design and it is recognized that infinite cross-sectional variations can be used as part of the present invention. The airfoil 20 may be made of any suitable construction and materials, such as fiberglass and/or carbon fiber.

With further reference to FIG. 2, the blade 20 includes orifices at two pressure sensing locations, $P_1$ and $P_2$. $P_1$ is located on the bottom surface 28 of the blade 20 and $P_2$ is located on the top surface 26 of the blade 20. A pressure transducer, 30, is provided to measure pressure differential between the two pressure sensing locations. Locations 30a, 30b indicate opposing sides of the pressure transducer diaphragm to determine the pressure differential between each point $P_1$ and $P_2$. In an alternate arrangement, multiple pressure transducers may be used. The location of $P_1$ and $P_2$ shown in FIG. 2 is merely illustrative of one example location of each orifice. The location of $P_1$ and $P_2$ may be generally dependent on the blade 20 or wing cross-sectional geometry. The optimal locations for $P_1$ and $P_2$ may be determined using analytical methods, such as computer simulation, or experimental methods, such as wind tunnel or flight test data. Surface pressure coefficient distributions and aerodynamic force coefficient data (lift, normal force, drag and tangential force) are generated as functions of angle of attack during the aforementioned simulations or tests. The nondimensional coefficient of pressure is defined as $$C_p = \frac{(P - P_\infty)}{q_\infty},$$

where P is the local pressure on the airfoil surface and $P_\infty$ is the freestream pressure far from the blade or wing. The dynamic pressure is defined as $$q_\infty = \frac{1}{2}\rho_\infty V_\infty^2,$$

where $\rho_\infty$ is the freestream air density and $V_\infty$ is the freestream air speed. Force coefficients are defined as $$C_F = \frac{F}{(q_\infty A)},$$

where F is the force (i.e. lift, drag, normal and tangential forces) and A is the airfoil planform area. The collected data are used to determine the pressure orifice location combination that yields the best correlation between the measured pressure differential and resulting aerodynamic load over the entire angle of attack range of interest. In other arrangements, the measured pressure differential may be used to determine the normal force or force acting normal to the airfoil's chord line.

Figure 4:
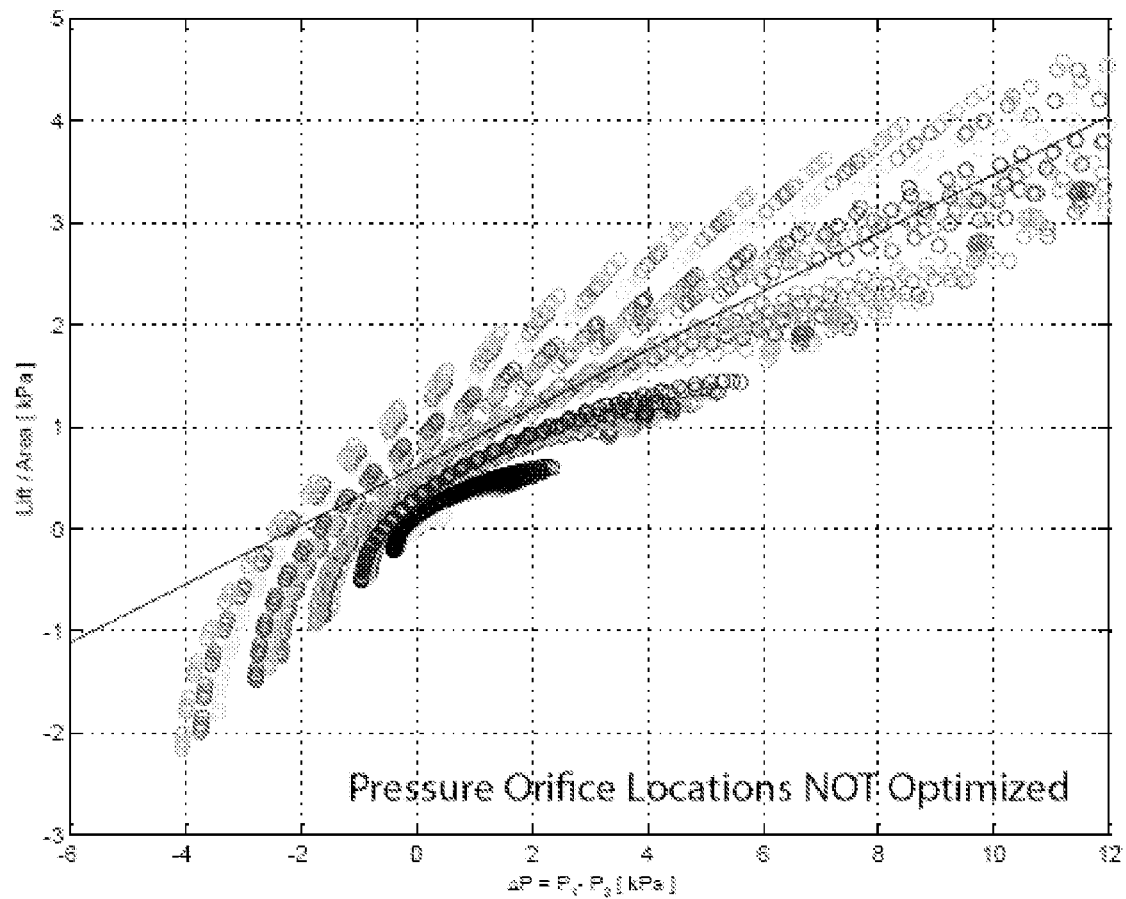
FIG. 4 is a graph depicting aerodynamic load versus pressure differential using non-optimized pressure sensing locations.
Figure 5:
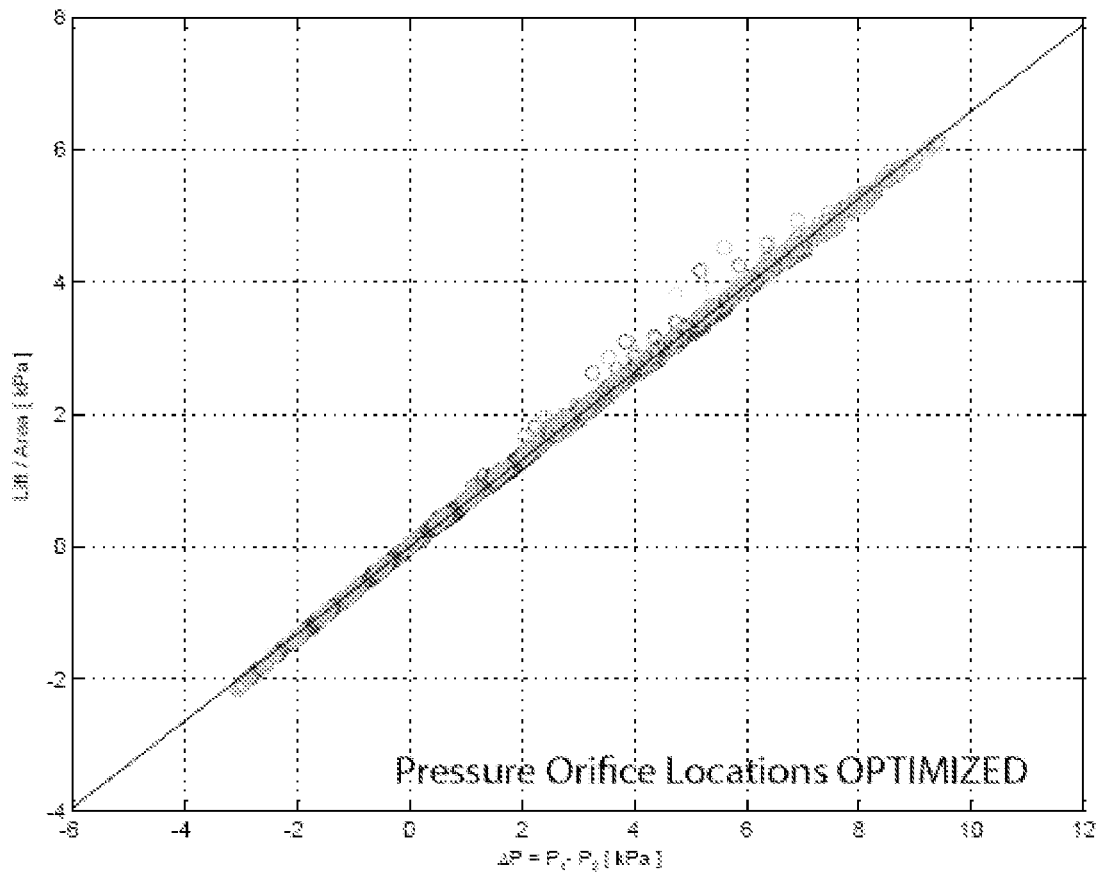
FIG. 5 is a graph depicting aerodynamic load versus pressure differential using optimized pressure sensing locations.

Optimal placement of the surface pressure orifices is accomplished via least-squares polynomial curve fitting. Every combination of port locations exhibits a unique relationship between aerodynamic load and measured pressure differential; therefore, every port combination also has a unique least-squares curve fit. This is shown in FIGS. 4 and 5, where $\Delta P$ represents the measured differential pressure and Lift/Area represents the aerodynamic load. The graphs in FIGS. 4 and 5 are provided to depict an advantage of optimizing the location of the pressure sensing locations using methods described herein. FIG. 4 illustrates a least squares correlation in which the locations of the orifices are not optimized. As clearly shown, the data do not provide a strong linear correlation between the differential pressure and the aerodynamic load. When non-optimal port locations are used, variations in air speed, density and temperature cause the data scatter shown in FIG. 4.

Alternatively, FIG. 5 illustrates the aerodynamic load versus differential pressure relationship using optimal pressure sensing locations. Optimal pressure sensing locations are determined as follows. First, operational ranges for $P_\infty$, $\rho_\infty$ and $V_\infty$ appropriate for the operation of a wind turbine or aircraft are assumed, and then the pressure and aerodynamic coefficient equations above are used to calculate a collection of dimensional aerodynamic load $$\left[\frac{F}{A} = q_\infty C_F\right]$$

and measured pressure difference $[\Delta P = P_1 - P_2 = (q_\infty C_{P1} + P_\infty) - (q_\infty C_{P2} + P_\infty) = q_\infty(C_{P1} - C_{P2})]$ data according to analytically or experimentally derived $C_F$ and $C_P$ and values. Second, the strength of the correlation between the lifting load and the measured pressure differential is evaluated using a least-squares approach. The least-squares method minimizes the squared error, defined as $$\varepsilon = \sum_{i=1}^{n}\left[\left(\frac{F}{A}\right)_i - f(\Delta P_i)\right]^2,$$

between the assumed fitting function and the existing aerodynamic load data points. In this function, i is the index of each of the n data points being fit and f is the fitting function. The squared error, $\varepsilon$, is calculated for all possible combinations of pressure orifice locations, and the optimal pressure port arrangement is chosen such that the lowest squared error between the load-pressure data and derived curve fit is achieved. Evaluating all possible combinations of port locations is a "brute-force" approach, but it is acknowledged that other methods such as conjugate-gradient optimization or genetic algorithms could be employed to determine the optimal port arrangement. In general, the correlation between pressure and aerodynamic load can be described using any number of curve fitting functions (polynomials, power series, radial basis functions, etc.); however, most candidate airfoil geometries show strongly linear correlation between pressure and load.

Figure 3:
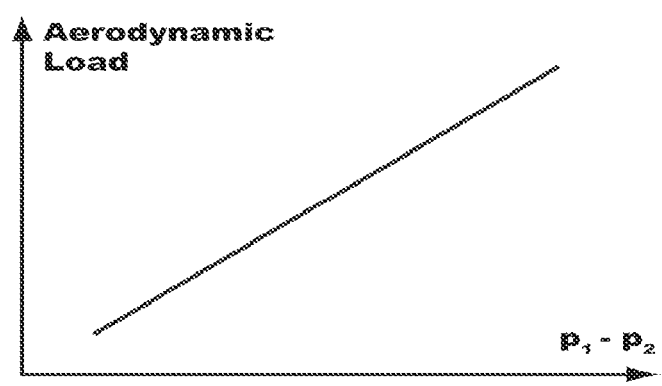
FIG. 3 is a graph depicting the linear correlation between the aerodynamic lift and pressure differential.

With further reference to FIG. 2, the difference between the pressures $P_1$ and $P_2$ (e.g., $P_1-P_2$) is determined via readings from the pressure transducer 30. Because of the linear correlation between the pressure differential and the load, the pressure differential may be plotted, similar to the graph shown in FIG. 3, and estimates of the load may be determined from this graph without requiring any additional information, such as dynamic pressure, local air speed, air density, barometric pressure or temperature, and the like.

In some arrangements, the pressure transducers 30 may transmit a signal, electrical or otherwise, to a control system, thereby permitting the aerodynamic load to be actively controlled. For instance, the control system may adjust blade pitch (collectively or independently) or blade length, etc. in order to increase or decrease aerodynamic load, based on the pressure differential determined between $P_1$ and $P_2$. This provides for more accurate and more immediate adjustment of the blades in order to improve efficiency of the wind turbine. In addition to blade pitch and length, the pressure signals could be utilized for the control of blades containing active flow controlling/modifying devices such as flaps, ailerons, deployable tabs, spoilers, air jets, synthetic jets, plasma actuators, etc.

In some arrangements, the pressure orifices may be protected from various environmental conditions, such as debris, ice, rain, and the like. Protection of the orifices may aid in providing accurate pressure readings and reducing maintenance outages, and the like.

Figure 6:
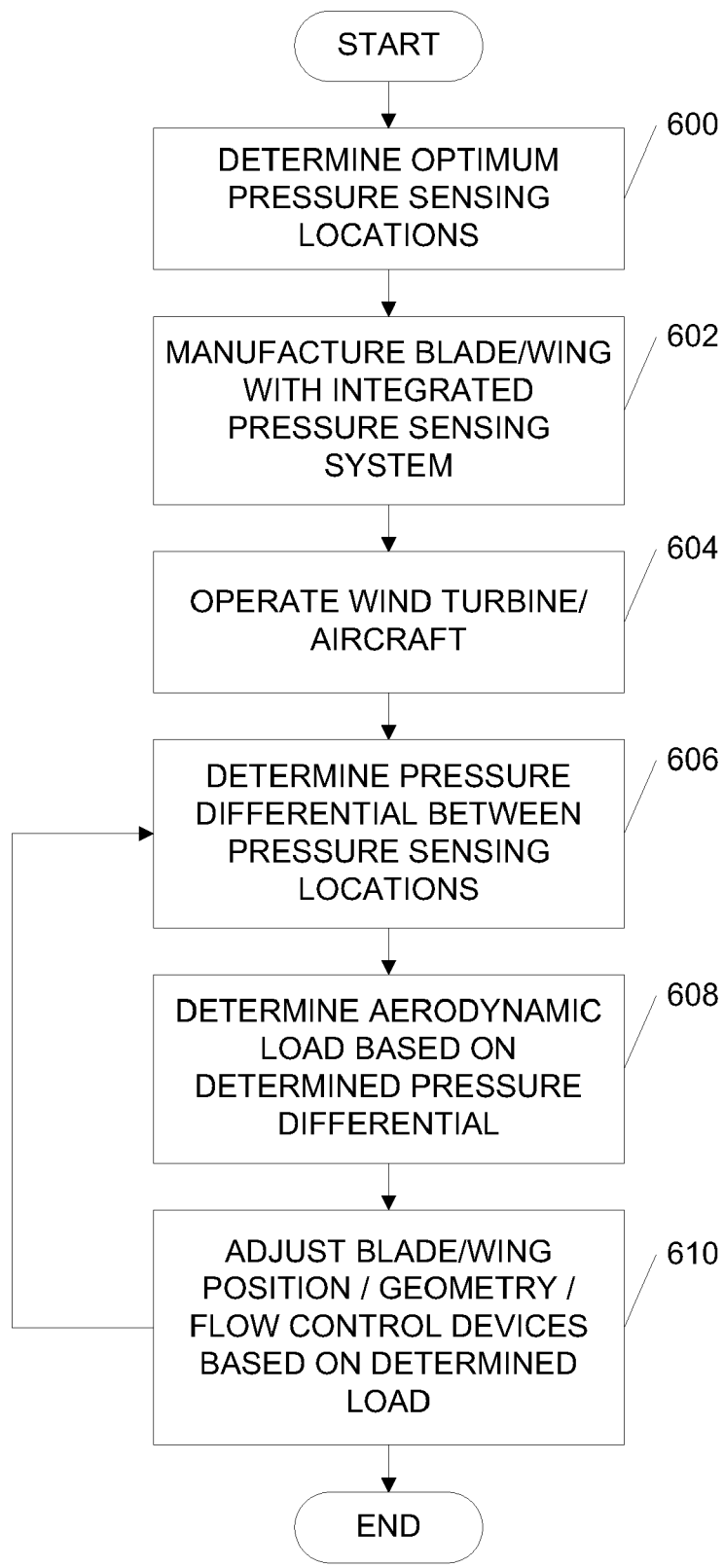
FIG. 6 illustrates one method of determining aerodynamic load based on a single pressure differential taken at optimal pressure sensing locations according to aspects described herein.

FIG. 6 illustrates one example method of estimating the aerodynamic load based on pressure differential. In step 600, the optimum location of two pressure sensing locations is determined. As discussed above, this optimum location may be determined using analytical or experimental methods. In step 602, the airfoil, hydrofoil, etc., such as the turbine blade or aircraft wing, is manufactured with an integrated pressure sensing system including pressure sensing ports positioned at the locations determined in step 600. In step 604 the aircraft, wind turbine, etc. is operated to engage airflow over the airfoil. In step 606, a differential pressure is determined between the two pressure sensing locations determined in step 600. A pressure transducer associated with each pressure location may transmit signals, electrical or otherwise, to a controller to determine the pressure differential. In step 608 the aerodynamic lift is determined based on the linear correlation between the determined pressure differential and aerodynamic lift. In step 610 the wind turbine blade or aircraft wing position, geometry or associated flow control devices may be adjusted based on the determined aerodynamic lift. Once the adjustment has been made in step 610, the process may continue by returning to step 606 to determine the pressure differential based on the adjusted position, geometry, etc. The process may continue through the remaining steps and may return to step 606 as desired.

As discussed above, the pressure based load measurement system and method described above allows estimation of the absolute aerodynamic load on an airfoil based on a single differential pressure measurement taken between two optimally located surface pressure orifices. No additional measurements, data, etc., such as dynamic pressure, local air speed, air density, barometric pressure or temperature are required in order to determine the load using the system and method described above. The optimal surface pressure locations may be determined by minimizing the error between an empirical curve fit, generated either analytically or experimentally, uniquely relating the measured pressure differential to a generated aerodynamic load, and the pressure load data used to generate the curve fit.

Although generally described in conjunction with a wind turbine, the above described system and method may be used with a variety of applications. For instance, the system and method may be implemented with airplane wings or helicopter rotors. Additionally or alternatively, the system and method described may be applied to non-aerodynamic applications, such as ship rudders and hydrofoils. In these arrangements appropriate transducer hardware would be used to measure the pressure differential.

The system and method described above may permit earlier sensing of rapid changes in operating conditions in order to provide more sophisticated, sensitive control of the aerodynamic forces generated by airfoils during operation. For example, measurement of aerodynamic load via pressure, instead of bending loads in a wing or blade, allow for the earlier sensing of rapid changes in the load such as a those induced on a wind turbine blade during a wind gust.

The disclosed invention is not limited by the above description and many variations of the above disclosed innovations will be evident to one skilled in the art.

Additionally, the methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

I claim:

1. A method comprising:
   determining a pressure differential between a first pressure location and a second pressure location on an airfoil; and
   based only on the determined pressure differential between the first pressure location and the second pressure location, determining an aerodynamic lift force associated with the airfoil.

2. The method of claim 1, further including identifying an optimum location for the first pressure location and the second pressure location.

3. The method of claim 2, wherein the step of identifying the optimum location for the first pressure location and the second pressure location includes determining using at least one of analytical or experimental methods of determining the optimum location.

4. The method of claim 2, wherein the step of identifying the optimum location for the first pressure location and the second pressure location includes identifying the first and second pressure locations based on a geometry of the airfoil.

5. The method of claim 1, wherein the step of determining the aerodynamic lift force includes determining the aerodynamic lift force based on the determined pressure differential and not based on any additional factors.

6. The method of claim 1, wherein the first pressure location is located on a top surface of the airfoil and the second pressure location is located on the bottom surface of the airfoil.

7. The method of claim 1, wherein the airfoil is at least one of an airplane wing, helicopter rotor, wind turbine blade, automobile spoiler and ship rudder.

8. The method of claim 1, further including adjusting at least one of a geometry, position and flow control device of the airfoil based on the determined aerodynamic lift force.

9. The method of claim 8, wherein the flow control device is at least one of flaps, ailerons, deployable tabs, spoilers, air jets, synthetic jets, and plasma actuators.

10. A method, comprising:
    determining a first pressure sensing location on an airfoil;
    determining a second pressure sensing location on the airfoil; determining a difference in pressure between the first pressure sensing location and the second pressure sensing location; and
    based only on the determined difference in pressure between the first pressure sensing location and the second pressure sensing location, determining a force acting normal to a chord line of the airfoil.

11. The method of claim 10, wherein the step of determining the first pressure sensing location and the second pressure sensing location includes determining the first and second location based on at least one of analytical or experimental data.

12. The method of claim 10, wherein the step of determining the force acting normal to the chord line of the airfoil includes determining the force based on the determined difference in pressure and not based on any additional factors.

13. The method of claim 10, wherein the first determined pressure sensing location is on a top surface of the airfoil and the second determined pressure sensing location is on a bottom surface of the airfoil.

14. The method of claim 10, wherein the step of determining the first and second pressure sensing locations includes determining the first and second pressure sensing locations based on a geometry of the airfoil.

15. The method of claim 10, wherein the airfoil is at least one of an airplane wing, helicopter rotor, wind turbine blade, automobile spoiler and ship rudder.

16. The method of claim 10, further including adjusting at least one of a position, geometry and flow control device of the airfoil based on the determined force acting normal to the chord line of the airfoil.

17. The method of claim 16, wherein the flow control device is at least one of flaps, ailerons, deployable tabs, spoilers, air jets, synthetic jets, and plasma actuators.

18. A wind turbine, comprising:
    a foundation;
    a hub connected to the foundation; and
    a plurality of wind turbine blades connected to and arranged about the hub, wherein at least one wind turbine blade includes a first pressure sensing orifice arranged on a top surface of the at least one wind turbine blade and a second pressure sensing orifice arranged on a bottom surface of the at least one wind turbine blade, the first pressure sensing orifice and second pressure sensing orifice being configured to enable determination of an aerodynamic load generated by the at least one blade based only on a difference in pressure between the first pressure sensing location and the second pressure sensing location.

19. The wind turbine of claim 18, further including at least one pressure transducer to determine the difference in pressure between the first pressure sensing location and the second pressure sensing location.

20. The wind turbine of claim 18, wherein the location of the first and second pressure sensing orifices is based on a geometry of the at least one wind turbine blade.

21. The wind turbine of claim 18, wherein the plurality of wind turbine blades are adjustable based on the aerodynamic load.

\* \* \* \* \*